United States Patent [19]

Henry et al.

[11] Patent Number: 5,774,711
[45] Date of Patent: Jun. 30, 1998

[54] APPARATUS AND METHOD FOR PROCESSING EXCEPTIONS DURING EXECUTION OF STRING INSTRUCTIONS

[75] Inventors: Glenn Henry; Terry Parks, both of Austin, Tex.

[73] Assignee: Integrated Device Technology, Inc., Santa Clara, Calif.

[21] Appl. No.: 686,666

[22] Filed: Jul. 26, 1996

Related U.S. Application Data

[63] Continuation-in-part of Ser. No. 623,657, Mar. 29, 1996, Pat. No. 5,752,015.

[51] Int. Cl.[6] ........................................ G06F 9/28
[52] U.S. Cl. ........................ 395/591; 395/595; 395/588
[58] Field of Search ................................. 395/387, 588, 395/590, 595, 591, 733

[56] References Cited

U.S. PATENT DOCUMENTS

| | | | |
|---|---|---|---|
| 4,449,184 | 5/1984 | Pohlman, III et al. | 395/250 |
| 4,862,407 | 8/1989 | Fette et al. | 395/800.35 |
| 4,885,682 | 12/1989 | Komoto | 395/583 |
| 4,970,641 | 11/1990 | Hester et al. | 395/733 |
| 5,404,473 | 4/1995 | Papworth et al. | 395/588 |
| 5,507,027 | 4/1996 | Kawamoto | 395/588 |
| 5,537,559 | 7/1996 | Kane et al. | 395/591 |

*Primary Examiner*—Richard L. Ellis
*Assistant Examiner*—Viet Vu
*Attorney, Agent, or Firm*—James W. Huffman

[57] ABSTRACT

An apparatus and method for handling exceptions during execution of string instructions is provided. The apparatus includes a translator which repetitively generates a micro instruction sequence applicable to the particular string operation, and an execution unit for executing the micro instruction sequence. A counter is provided to hold a count value corresponding to the number of times the micro instruction sequence is to be executed, and is incremented/decremented each time the sequence is executed. The translator continues to generate the micro instruction sequence until receiving a signal from the counter which indicates that all of the string has been operated upon, e.g., if the counter reaches zero. If exceptions occur during the operation of the translator generated string instructions, the value of the counter is stored in a temporary register, the string operation is ended as if the counter reached zero, the exception is handled, the value of the counter is restored, and the string operation is restarted.

13 Claims, 9 Drawing Sheets

FIG. 5 (Prior Art)

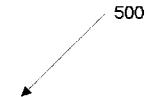

Pipeline flow for move string instruction (MOVS)  CX=3

| 514 Cycle | 502 Fetch | 504 Translator Decode | 506 Register | 508 Address | 510 Execute | 512 Write Back | |
|---|---|---|---|---|---|---|---|
| 1 | REP MOVS | X | X | X | X | X | |
| 2 | NEXT | REP MOVS | X | X | X | X | |
| 3 | X | NEXT | Load AX,[SI] | X | X | X | |
| 4 |  | X | Store [DI],AX | Load AX,[SI] | X | X | |
| 5 |  |  | DEC CX | Store [DI],AX | Load AX,[SI] | X | |
| 6 |  |  | JNZ | DEC CX | Store [DI],AX | Load AX,[SI] | ⎫ |
| 7 |  |  | Load AX,[SI] | JNZ | DEC CX | Store [DI],AX | ⎪ |
| 8 |  |  | Store [DI],AX | Load AX,[SI] | JNZ | DEC CX | ⎪ |
| 9 |  |  | DEC CX | Store [DI],AX | Load AX,[SI] | JNZ | ⎪ |
| 10 |  |  | JNZ | DEC CX | Store [DI],AX | Load AX,[SI] | ⎬ 3 Moves / 12 Clocks |
| 11 |  |  | Load AX,[SI] | JNZ | DEC CX | Store [DI],AX | ⎪ |
| 12 |  |  | Store [DI],AX | Load AX,[SI] | JNZ | DEC CX | ⎪ |
| 13 |  |  | DEC CX | Store [DI],AX | Load AX,[SI] | JNZ | ⎪ |
| 14 |  |  | JNZ | DEC CX | Store [DI],AX | Load AX,[SI] | ⎪ |
| 15 |  |  | NEXT | JNZ | DEC CX | Store [DI],AX | ⎭ |
| 16 |  |  | X | NEXT | JNZ | DEC CX | |
| 17 |  |  |  | X | NEXT | JNZ | |
| 18 |  |  |  |  | X | NEXT | |
| 19 |  |  |  |  |  | X | |

FIG. 8

Pipeline flow for move string instruction (MOVS)  CX=3

| 814 Cycle | 802 Fetch | 804 Translator Decode | 806 Register | 808 Address | 810 Execute | 812 Write Back | |
|---|---|---|---|---|---|---|---|
| 1 | REP MOVS | X | X | X | X | X | |
| 2 | NEXT | REP MOVS | X | X | X | X | |
| 3 | X | NEXT | Load AX,[SI] | X | X | X | |
| 4 | | X | Store [DI],AX | Load AX,[SI] | X | X | |
| 5 | | | Load AX,[SI] | Store [DI],AX | Load AX,[SI] | X | |
| 6 | | | Store [DI],AX | Load AX,[SI] | Store [DI],AX | Load AX,[SI] | ⎫ |
| 7 | | | Load AX,[SI] | Store [DI],AX | Load AX,[SI] | Store [DI],AX | ⎪ |
| 8 | | | Store [DI],AX | Load AX,[SI] | Store [DI],AX | Load AX,[SI] | ⎬ 3 Moves / 8 Clocks |
| 9 | | | Load AX,[SI] | Store [DI],AX | Load AX,[SI] | Store [DI],AX | ⎪ |
| 10 | | | Store [DI],AX | Load AX,[SI] | Store [DI],AX | Load AX,[SI] | ⎭ |
| 11 | | | NEXT | Store [DI],AX | NOP | Store [DI],AX | |
| 12 | | | | NEXT | NOP | NOP | |
| 13 | | | | X | NEXT | NOP | |
| 14 | | | | | X | NEXT | |
| 15 | | | | | | X | |

APPARATUS AND METHOD FOR PROCESSING EXCEPTIONS DURING EXECUTION OF STRING INSTRUCTIONS

CROSS-REFERENCE TO RELATED APPLICATION(S)

This application is a continuation-in-part of U.S. application Ser. No. 08/623,657, filed on Mar. 29, 1996, now U.S. Pat. No. 5,752,015.

BACKGROUND OF THE INVENTION

1. Field of the Invention

This invention relates in general to the field of instruction execution in computer systems, and more particularly to a method and apparatus for handling interrupts and exceptions while executing string instructions.

2. Description of the Related Art

Byte and string manipulation has always been important in computer processing. A primary application is in the area of text processing, which is the management of sequences of bytes that contain the alphanumeric codes for characters, i.e., character strings. In text processing it is essential to have program sequences for moving and comparing character strings, and for inserting strings into and deleting them from other strings. In addition, it is often necessary to search a string for a given substring or to replace a substring with a different substring. Other applications requiring string manipulation include array processing, code conversion, and searching for keys in a file system.

During execution of string program sequences, it is also necessary to allow a processor to be interrupted, or to handle exceptions caused by the program sequences, and to allow the processor to resume execution of the string sequences where it left off. To appreciate the novelty of the present invention, a general background on how interrupts and exceptions effect program execution will be provided. Following this, a brief overview of prior art program sequences for operating on strings will be given.

Referring to FIG. 1, a computer system 100 is shown. The computer system 100 includes a microprocessor 102 connected to a data bus 104. The microprocessor 102 is also connected to an interrupt controller 106 via an interrupt line 108 and a control bus 110. The interrupt controller 106 is connected to a plurality of hardware devices including: a system timer 112, a keyboard interface 114, a serial port 116, a floppy disk controller 118, a hard disk controller 120 and a parallel port 122. Also connected to the interrupt controller are a plurality of expansion slots 124.

Interrupts are caused by asynchronous events which are external to the microprocessor 102. In operation, when any one of the hardware devices 112–124 wish to communicate with the microprocessor 102, they provide a signal to the interrupt controller 106. The interrupt controller is used as an interface between the microprocessor 102 and the hardware devices 112–124. The interrupt controller 106 receives signals from the hardware devices 112–124, determines which hardware device 112–124 requires access to the microprocessor 102, and sends an interrupt signal on line 108 to the microprocessor 102. In addition, the interrupt controller 106 utilizes the data bus 104, and the control bus 110 to communicate with the microprocessor 102 to let it know which hardware device 112–124 requires attention. The interrupt causes the microprocessor 102 to temporarily suspend execution of the current program and forces it to jump to another program, called the interrupt service routine, or ISR. After the microprocessor 102 services the interrupt, it returns to the original program at the point of interruption, and sends a signal to the interrupt controller 106 to clear the interrupt.

The type of ISR which is executed depends on the type of device creating the interrupt, and its current condition. For example, the parallel port 122 may generate an interrupt request to ask the microprocessor 102 for the next character to be sent to a printer. The hard disk controller 120 may generate an interrupt request to tell the microprocessor 102 that a data transfer to or from memory has been completed. The keyboard interface 114 may generate an interrupt request to inform the microprocessor 102 that a key has been pressed. The microprocessor may respond by performing an I/O read from the keyboard interface 114 to get the keyboard character.

All of the above discussed interrupts are asynchronous events which occur outside of the microprocessor 102, which cause the microprocessor 102 to temporarily suspend execution of the current program in order to service the interrupt. Similarly, exceptions cause the microprocessor 102 to temporarily suspend execution of the current program, jump to an exception handler, correct the condition which caused the exception, and return to the current program. However, exceptions are created by processes internal to the microprocessor 102.

Exceptions are unusual or invalid conditions associated with the execution of a particular macro instruction. In x86 architecture microprocessors, it is typical to classify exceptions as either a fault, a trap, or an abort, depending on when it is reported, and whether the program causing the exception can be resumed.

In the case of an abort, a severe condition, such as hardware failures, or illegal or inconsistent values in system tables is reported. In these instances, the program causing the abort cannot be resumed, so the exception handler often rebuilds the system tables and restarts the operating system.

A fault is an exception that is reported before the instruction that causes the exception. In an x86 microprocessor, the code segment (CS) register, the instruction pointer (EIP), and the EFLAGS register are pushed onto a stack before transferring control to the exception handler. These values point to the macro instruction causing the fault. Once the problem causing the exception has been fixed, the faulting program can be resumed by executing the IRET macro instruction, which pops the CS and EIP values off the stack, then pops the EFLAGS value.

A trap is an exception that is reported after the macro instruction causing the exception. The CS and EIP values saved when transferring control to the handler for the trap point to the instruction dynamically after the macro instruction causing the trap. Because CS and EIP point to the next macro instruction, the macro instruction causing the trap cannot generally be identified.

Now referring to FIG. 2, a memory map 200 is shown which illustrates program flow during an exception. While executing a program 202, an exception 204 may occur which causes program flow to jump to a correction routine 212 within an exception handler 206. The correction routine 212 executes a sequence of instructions designed specifically to correct the problem which caused the exception. Upon completion of the correction routine 212, program flow returns to the program 202 at one of two locations. If the condition which created the exception 204 was a fault, then program flow resumes at memory location 208. If the condition which created the exception 204 was a trap, then program flow resumes at memory location 210.

Now referring to FIG. 3, a block diagram 300 is shown which illustrates instruction pointer registers within a microprocessor which are used by the exception handler to resume program flow upon completion of an exception. As one skilled in the art will appreciate, an instruction pointer is used to indicate the memory location of the instruction that is being executed by the microprocessor. The block diagram 300 includes an instruction pointer (IP) register 302, and a next sequential instruction pointer (NSIP) register 304. These registers 302, 304 are provided as inputs to a mux 306. Logic (not shown) external to the mux 306 selects which of the registers 302, 304 will be input into an exception handler instruction pointer (EHIP) register 308. The IP 302 contains the memory address of the instruction that is currently being executed by the microprocessor. The NSIP 304 contains the memory address of the next sequential instruction that may be executed by the microprocessor.

When an exception occurs, the microprocessor determines whether the condition which created the exception was a fault or a trap. If the condition was a fault, then the contents of the IP register 302 (prior to the exception) are selected as the input to the EHIP register 308. If the condition was a trap, then the contents of the NSIP 304 (prior to the exception) are selected as the input to the EHIP register 308. The contents of the EHIP register 308 are pushed onto the stack before transferring control to the exception handler. Upon completion of the exception handler routine, the exception handler pops the contents of the EHIP register 308 off the stack to branch back to the executing program.

With the above as background to interrupts and exceptions within a microprocessor, examples will now be provided which discuss string manipulation. More specifically, a number of prior art methods of moving a string from one location in memory to another will be shown. For convenience, the examples will utilize the nomenclature of an x86 microprocessor. It should be appreciated by one skilled in the art that the use of the x86 registers and macro instructions are for illustrative purposes only. Other processors or architectures may be easily substituted for this illustration.

An x86 microprocessor provides a number of registers which are used to store: 1) the address of the first byte or word in a source string; 2) the address of the first byte or word in a destination string; and 3) the number of times the string operation must be repeated to manipulate the entire string. In a protected mode memory model, the source address for a string is found by adding the contents of the data segment base register DS with that of the source index register SI. One skilled in the art understands that the use of DS may be explicitly overridden by specifying another segment register as the base. The destination address for a string is found by adding the contents of the extra segment base register ES to the contents of the destination index register DI. Once a string operation is performed at a first source/destination address, the contents of SI and DI can be incremented or decremented, as specified by the programmer, and the operation repeated. By placing the string operation and increment/decrement steps within a loop, an entire string can be manipulated or transferred. The number of times the string instruction must be repeated is stored in general purpose register CX.

Referring now to FIG. 4, a memory map 400 is shown. The memory map 400 contains a number of different memory locations 402, 404 for storing data. Each of these memory locations 402, 404 have addresses 406 which identify, much like a postal address, the location in memory that is being referred to. Within the memory map 400 is a source string 408 of data which contains a plurality of bytes or words 410. In the present figure, the string 408 will be moved from a source location 412 to a destination location 414.

The address of the source location 412 is determined by adding the contents of a base address register DS to the contents of an index register SI. The address of the destination location 414 is determined by adding the contents of a base address register ES to the contents of an index register DI. By moving a word from location DS+SI to location ES+DI, then incrementing the contents of SI and DI, and repeating the move and increment steps, all of the string 408 will be moved from location 412 and following, to location 414 and following.

An x86 macro instruction program sequence which performs the string move operation illustrated in FIG. 4 is shown below.

TABLE I

|  | MOV | SI,A | ;where A is offset of source |
|---|---|---|---|
|  | MOV | DI,B | ;where B is offset of destination |
|  | MOV | CX,L | ;where L is length of string |
| AGAIN | MOV | AX,[SI] | ;move word from source |
|  | MOV | [DI],AX | ;move word to destination |
|  | DEC | CX | ;decrement counter |
|  | JNZ | AGAIN | ;continue loop until length is zero |

In the above illustration, the start address of the source and destination are loaded into the SI and DI registers. In addition, the length of the string is loaded into the CX register. At this point, a program loop begins which moves a string, one word at a time, from a source address to a destination address. While not shown, internal to the microprocessor is logic which automatically increments or decrements the SI and DI registers after each move operation. After the moves have occurred, the CX register is decremented. At this point a jump if not zero instruction JNZ is executed. This instruction branches back to the start of the loop unless CX reaches zero. When the CX register reaches zero, a zero flag is set which is tested by the JNZ instruction. If CX is zero, operation leaves the loop and continues to the next instruction.

While the above program sequence can perform a move string operation, it is clumsy to write, and time consuming for the processor. An abbreviated form of the move instruction has been provided which shortens the code sequence required for string operations. This move instruction has the primitive MOVS for move string. The MOVS primitive replaces the instructions: MOV AX,[SI]; and MOV [DI], AX. Additionally, a repeat prefix REP may be placed with the MOVS instruction to indicate that the instruction should repeat until the CX register equals zero. The REP prefix replaces the JNZ portion of the macro instruction sequence, and adds the DEC CX instruction. Thus, the above program sequence may be replaced with the following:

TABLE II

| MOV | SI,A | ;where A is offset of source |
|---|---|---|
| MOV | DI,B | ;where B is offset of destination |

TABLE II-continued

| | MOV CX,L | ;where L is length of string |
|---|---|---|
| REP | MOVS | ;repeat move string operation until done | where the offsets and string length are first initialized, and then the move string operation is written with a single primitive MOVS having a prefix REP.

While the above sequence illustrates a simplified program for manipulating strings, the operation speed of the move string sequence has not been improved. Internally, the microprocessor is still performing the same instruction sequence as shown in Table I. This can be illustrated by referring to FIG. 5.

FIG. 5 provides a pipeline flow diagram 500 for a move string instruction in a five stage microprocessor. The elements of the stages of the microprocessor include: 1) a fetch stage 502; a translate/decode stage 504; a register stage 506; an address stage 508; an execute stage 510; and a write back stage 512. The stages provided are for illustrative purposes only. It should be understood that in other processors, some of these elements may be combined, or the order of the elements may be slightly altered. For a general background on pipeline processors, see *Computer Architecture: A Quantitative Approach*, by John L. Hennessy and David A. Patterson, 2nd ed. In addition to the processor stages 502–512, a processor cycle column 514 is shown. The cycle 514 provides a relative time measurement for the flow of instructions through the pipeline.

At clock cycle 1, the REP MOVS instruction is fetched. While not shown it is presumed that the index registers SI and DI have already been initialized. In addition, the CX register has been loaded with a value of 3, as an example. Following the REP MOVS instruction is an instruction NEXT which is provided to indicate that some other instruction outside of the string move follows. After NEXT is an X to indicate that other instructions beyond the present illustration occur. At clock cycle 2, the REP MOVS instruction has been fetched, and provided to an instruction buffer. At clock cycle 3, the REP MOVS instruction is translated into a micro instruction sequence which performs the function defined by REP MOVS. As stated above, the actions required internal to the microprocessor are not changed by REP MOVS, merely simplified from a programmer's viewpoint. The REP MOVS instruction is thus translated into the micro instruction sequence:

TABLE III

| Load | AX,[SI] | ;load word from source |
|---|---|---|
| Store | [DI],AX | ;store word to destination |
| Dec | CX | ;test flag for zero |
| JNZ | | ;if not zero, branch |

Each of the instructions in Table III are provided by the translator, or are provided by a control ROM, but each requires at least a single clock cycle. Thus, at clock cycle 3, the Load AX,[SI] instruction proceeds to the register stage 506. The registers DS and SI are accessed to retrieve their contents to calculate the address of the first byte of the string. At clock cycle 4, the Load AX,[SI] instruction proceeds to the address stage 508 where the values of the DS and SI registers are added together. And, the Store [DI],AX instruction is provided to the register stage 506 to retrieve the contents of the ES and DI registers. These instructions proceed down the pipeline until they leave the write back element 512. Following the Load and Store instructions are the DEC CX and JNZ instructions. It is typical for these to be written simply as JNZ, with the JNZ instruction requiring two clock cycles for execution. For example, during a first clock cycle, the CX register is decremented, and a flag is set indicating whether the CX register reached zero. During the second clock cycle the JNZ instruction tests the flag, which causes the processor to continue execution with the next instruction, or causes a jump to occur. In this illustration, the DEC CX instruction, and the JNZ instructions, are required at the end of every Load/Store operation. However, as shown in clock cycle 15, in the register stage 506, after the 3rd Load/Store operation, the NEXT instruction occurs. This is because the CX register has been decremented to zero, and the loop is complete.

In the method for performing a move instruction described above, the processor was required to execute twelve clock cycles to perform three moves. Six of the clock cycles were required for actually moving data, while the other six cycles were required for test and branch operations to continue the loop. Thus, 50% of the time associated with the move string operation is attributable to branch overhead. What should be clear from the above is that typical execution of string operations, such as the REP MOVS instruction requires significant overhead to perform the test/branch operation.

A solution for improving the processing speed of string instructions is illustrated in the flow chart 600 of FIG. 6. In this example, multiple move sequences are provided which reduce the overhead associated with long string operations. Referring to FIG. 6, the flow begins at block 602. Proceeding to decision block 604, a first test is performed to determine whether the length of the string move is greater than or equal to eight words, i.e., is CX$\geq$8? If the answer to the test is yes, then flow proceeds to block 606 where eight back to back load/store operations occur. If the answer is no, then flow proceeds to decision block 608 to test whether the length of the string is greater than or equal to 4 words. If yes, flow proceeds to block 610 where 4 back to back load/store operations occur. If no, then flow proceeds to decision block 612. It is important to understand that flow also proceeds from execution block 610 to decision block 612. Since flow will never arrive at block 610 until the length of the string is less than 8 words, as illustrated by blocks 604 and 606, the largest string length possible at decision block 612 is three words. Thus, whether arriving at block 612 from decision block 608 or block 610, decision block 612 tests to see if the length of the string is greater than or equal to two words. If yes, flow proceeds to execution block 614 where two back to back load/store operations occur. If no, flow proceeds to decision block 616. Flow also proceeds to block 616 from execution block 614. Decision block 616 tests to see whether the remaining length of the string is greater than or equal to one word. If no, then the string operation is over and is terminated at block 620. If yes, then flow proceeds to execution block 618 where a single load/store operation is performed. Flow then is terminated at block 620.

What has been shown with reference to FIG. 6 is a method for limiting the number of test/branch operations by providing multiple load/store sequences which can operate in batches based on the length of the string. However, what should be clear is that a number of test/branch operations are required, in this case 4 JNZ operations at a minimum, with an additional JNZ for every 8 words. It should be appreciated by one skilled in the art that the length chosen for the decision and execution blocks is for illustrative purposes only. Other values may be selected. In addition, other decision blocks having a greater test length may also be added. While the test/branch overhead for longer strings is improved over the 50% method discussed above, string operations still require significant overhead for looping.

In the parent application cited above, an apparatus and method for improving the execution speed of string instructions was disclosed. This application teaches a novel method and apparatus which dramatically reduces the overhead typically associated with string manipulation. What will be discussed in the Detailed Description below is a method and apparatus which improves the execution speed of string instructions, but which also allows interrupts and exceptions to occur during string processing.

SUMMARY

To address the above-detailed deficiencies, it is an object of the present invention to provide an apparatus and method which improves the execution speed of string instructions, allows exceptions to occur during execution of the string instructions, and provides a mechanism for returning to the string instructions after handling of the exception.

Accordingly, in the attainment of the aforementioned object, it is a feature of the present invention to provide a microprocessor, for executing macro string instructions. The microprocessor includes: a translator, for decoding the macro string instructions into a sequence of micro instructions, and for repetitively generating a first portion of the sequence of micro instructions; a control ROM, connected to the translator, for storing a second portion of the sequence of micro instructions, and for storing exception handler routines; an execution unit, connected to both the translator and to the control ROM, for executing the sequence of micro instructions, and the exception handler routines; and exception logic, connected to the translator, for interrupting the repetitive generation of the first portion of the sequence of micro instructions; whereby when the exception logic interrupts the repetitive generation of the first portion of the sequence of micro instructions, the translator causes the control ROM to provide the second portion of the sequence of micro instructions to the execution unit, to provide at least one of the exception handler routines to the execution unit, and upon return from the at least one of the exception handler routines, to continue the repetitive generation of the first portion of the micro instruction sequence.

In another aspect, it is a feature of the present invention to provide a processing system for executing a string instruction, and for handling exceptions during the execution of the string instruction. The processing system includes: a memory system, for storing a string of data; a translator, for decoding the string instruction into a repetitive sequence of micro instructions for operation upon the string of data; an execution unit, connected to the translator, for executing the repetitive sequence of micro instructions; a counter connected to the translator and to the execution unit, for storing a count value indicative of the number of times the repetitive sequence needs to be executed to operate on all of the string of data, for counting the number of times the execution unit has executed the repetitive sequence of micro instructions; and for providing a first signal to the translator when all of the string of data has been operated upon; a register, connected to the counter, for temporarily storing count information during handling of the exceptions; and exception logic, connected to the translator, for interrupting the execution of the repetitive sequence of micro instructions with a second signal upon the occurrence of an exception; whereby the second signal causes the processing system to transfer the count information to the register, to handle the exceptions, to transfer the count information to the counter, and to resume execution of the string instruction.

In yet another aspect, it is a feature of the present invention to provide a method for handling an exception during execution of a string instruction within a processing system, the method including the steps of: initializing a counter with a count value corresponding to the number of micro instruction iterations required to perform the string instruction; generating the micro instruction iterations, and providing the micro instruction iterations to an execution unit; executing the micro instruction iterations; stopping the step of executing the micro instruction iterations when the number of micro instruction iterations required to perform the string instruction have been performed; interrupting the step of generating when the exception occurs; handling the exception; and reinitializing the counter with a count value corresponding to the number of micro instruction iterations required to complete the string instruction.

In an additional aspect, it is a feature of the present invention to provide a processing system having a translator for generating a repetitive sequence of first micro instructions related to a macro string instruction, a control ROM for providing second micro instructions to complete the string instruction and for storing exception routines, an execution unit for executing the first and second micro instructions and the exception routines. The processing system includes: an instruction pointer, for pointing to a first macro instruction; a next instruction pointer, for pointing to a second macro instruction; control logic, connected to both of the instruction pointer and the next instruction pointer, for selecting between the first or the second macro instruction to be returned to; and exception logic for interrupting the execution unit with either a fault or a trap; whereby when the exception logic interrupts the execution unit with either a trap or a fault, if the processing system was executing the repetitive sequence of first micro instructions at the time of the interrupt, the control logic selects the first macro instruction to be returned to after the exception.

An advantage of the present is that exceptions and interrupts will be allowed during execution of translator generated string instructions.

An additional advantage of the present invention is that translator generated string instructions can be interrupted, and returned to, without losing the count, or the place in the string upon which operations are performed.

Additional features and advantages of the invention will be described hereinafter. Those skilled in the art should appreciate that they can readily use the disclosed conception and specific embodiment as a basis for designing or modifying other structures for carrying out the same purposes of the present invention.

BRIEF DESCRIPTION OF THE DRAWINGS

These and other objects, features, and advantages of the present invention will become better understood with regard to the following description, and accompanying drawings where:

FIG. 5 is a pipeline diagram for a move string instruction implemented using a prior art method.

FIG. 8 is a pipeline diagram illustrating a move string instruction utilizing the processor of FIG. 7.

DETAILED DESCRIPTION

Figure 7:
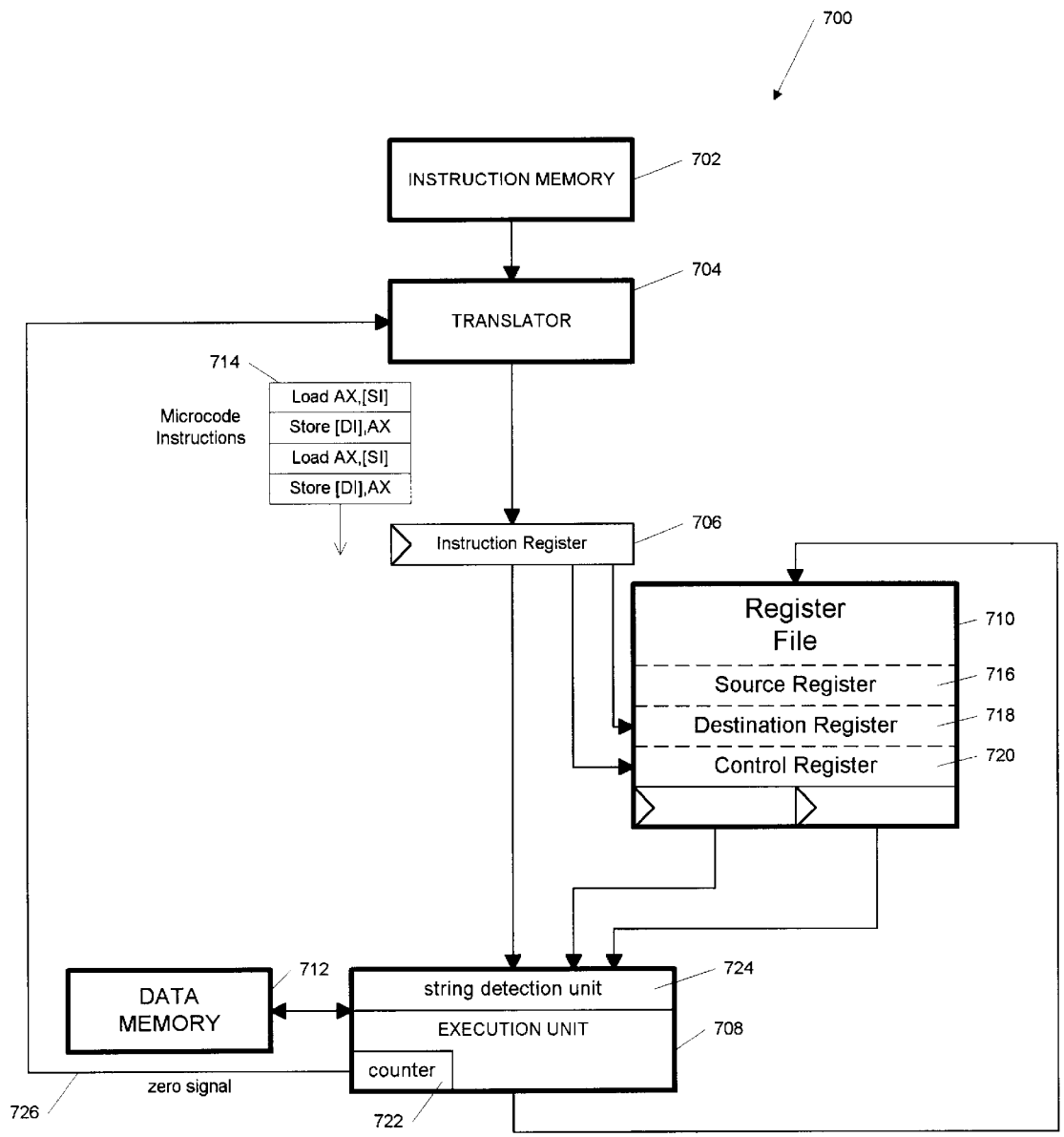
FIG. 7 is a block diagram of a processor implementing a translator generated string move instruction.

Referring to FIG. 7, a schematic diagram 700 is provided which illustrates an apparatus for implementing the improved execution of string instructions, according to the present invention. The diagram 700 includes an instruction memory 702 which is connected to a translator 704. The instruction memory 702 may be any type of storage typically accessed by a processor, such as DRAM or SRAM, or possibly a dedicated cache system, either external to a processor or within the processor. The translator 704 is shown connected to an instruction register 706 which delivers opcodes and operands to an execution unit 708, and to a register file 710.

The register file 710 provides temporary storage for data, and when accessed by the instruction register 706, can deliver the data to the execution unit 708. The register file 710 includes a number of registers including a source address register 716, a destination address register 718, and a general register 720. The general register 720 could be used as the CX register discussed above, for holding the value associated with the length of a particular string.

The execution unit 708 executes the instructions provided by the instruction register 706, and then writes the data back into either the register file 710, or into the data memory 712. The execution unit 708 includes a counter 722 and a string detection unit 724. Attached to the counter 722 is a signal line 726 which is also connected to the translator 704. The signal line 726 is used to signal the translator 704 that the counter 722 has reached zero, as will be further discussed below.

One familiar with computer architecture will understand that other blocks may be provided to complete a modern processor. However, for ease of illustration, discussion will focus on those elements required to appreciate the novelty of the present invention.

Figure 4:
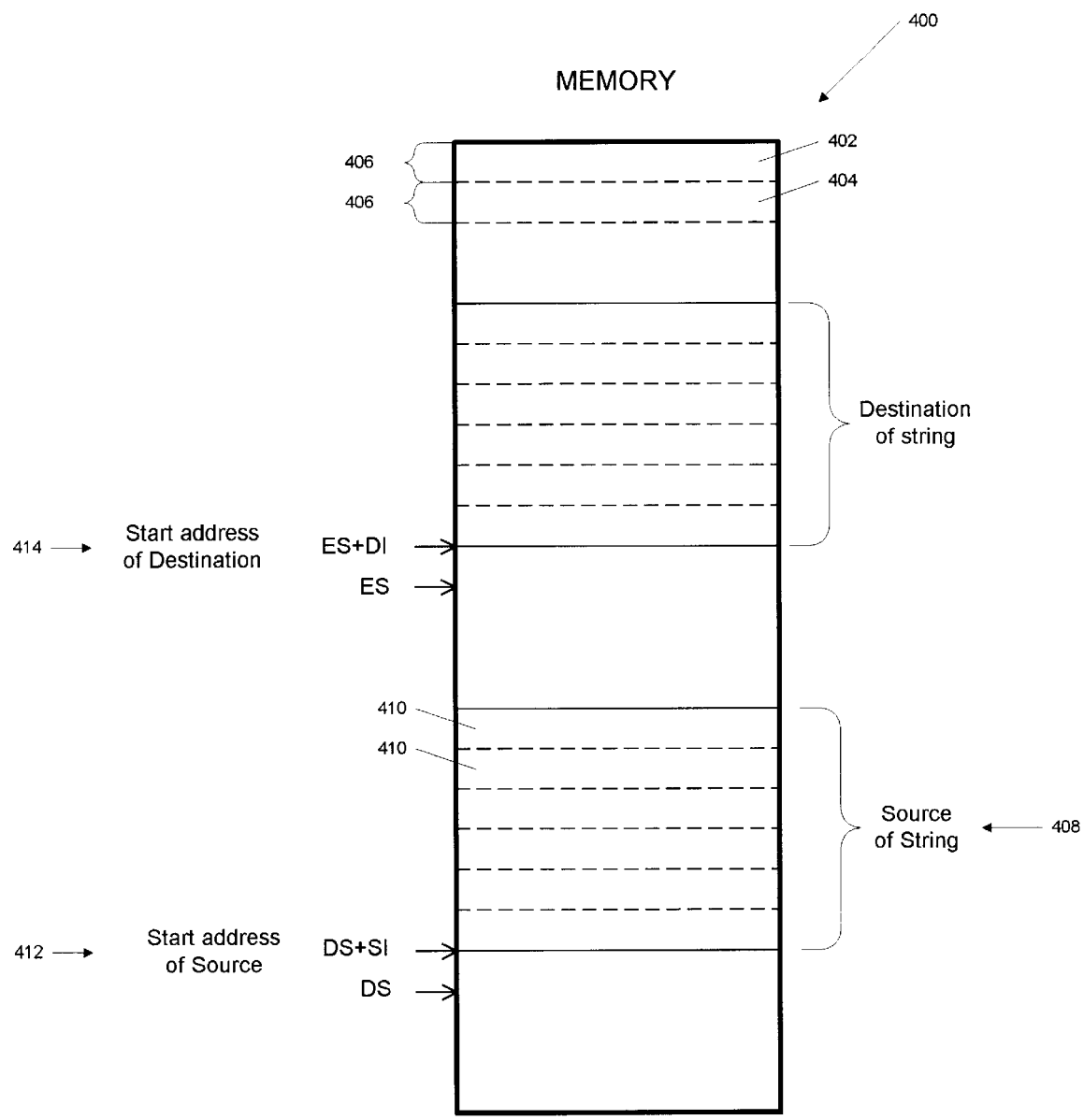
FIG. 4 is a memory map indicating source and destination addresses for blocks of data upon which string instructions operate.
Figure 6:
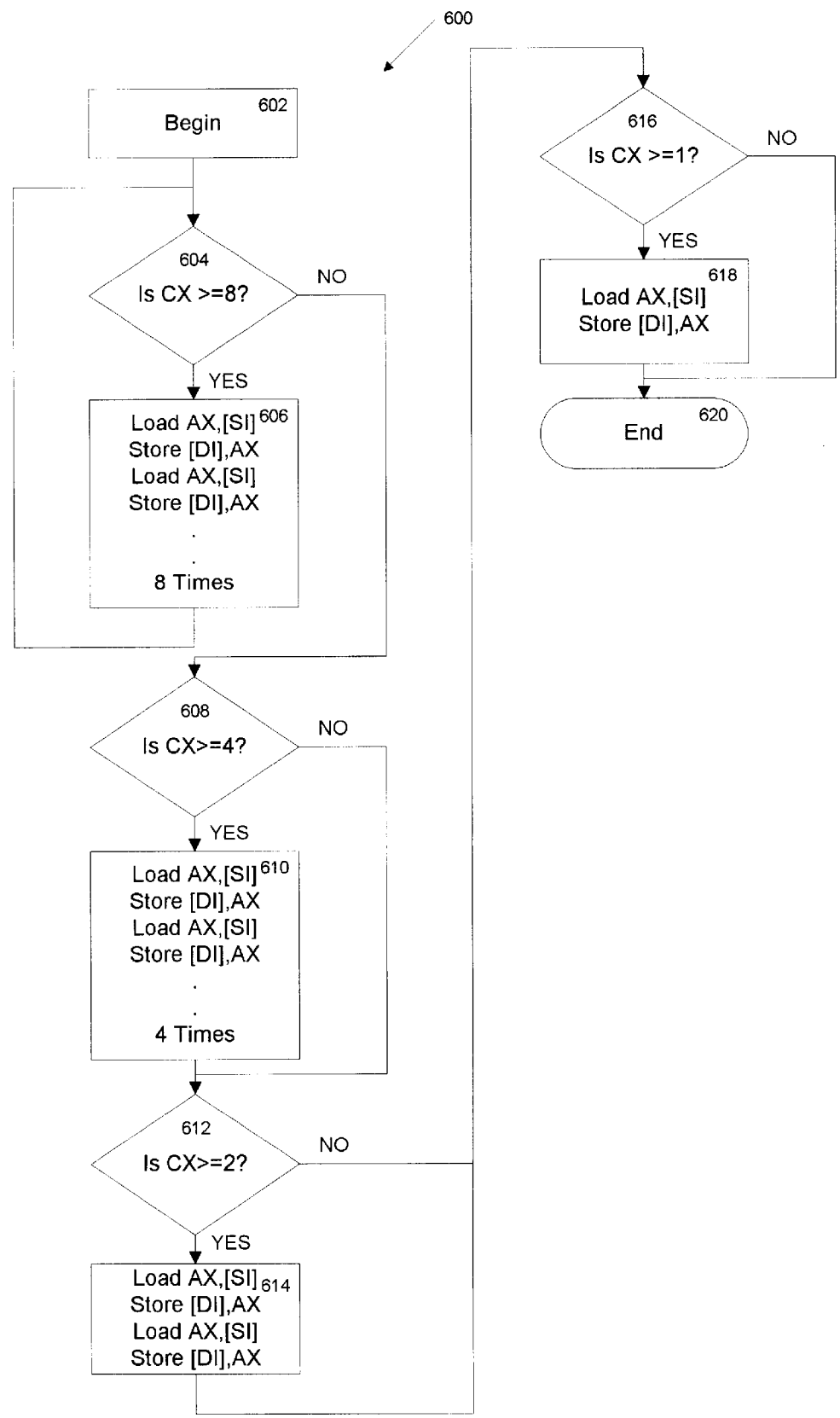
FIG. 6 is a flow chart illustrating a move string instruction implemented using another prior art method.

The instruction memory 702 provides macro instructions (not shown) to the translator 704. The macro instructions may be similar to the REP MOVS instruction discussed above with reference to FIGS. 4–6. The translator 704 identifies the macro instruction, and if the macro instruction is a string instruction, begins generating a string of micro instructions applicable to the macro string instruction. If the macro instruction is a MOVS, for example, the translator 704 would generate a repetitive sequence of Load/Store micro instructions 714, ad infinitum. Prior to providing the repetitive sequence of micro instructions, the translator 704 issues a command to the register file 710 to have the value in the general register 720 delivered to the execution unit 708. The execution unit delivers the value in the general register 720 to the counter 722. Thus, if the length of the string has been stored in the general register 720 prior to beginning the macro string instruction, this value can be used by the counter 722 to count the number of times the micro instruction sequence should be executed by the execution unit 708.

To better illustrate the operation of the apparatus shown in FIG. 7, the reader is referred to the pipeline diagram 800 of FIG. 8. For convenience, like elements in the stages have been labeled as in FIG. 5, as elements 802–814. FIG. 8 illustrates the pipeline flow of a REP MOVS macro instruction executed by the apparatus of FIG. 7. At clock cycle 1, the REP MOVS instruction is fetched from the instruction memory 702 and provided to the translator 704. At clock cycle 2, the translator decodes the macro instruction and signals the register file 710 to deliver the value in general register 720 to the execution unit 708. The execution unit 708 then delivers this value to the counter 722. At the end of clock cycle 2, the first micro instruction of the string sequence is stored in the instruction register 706. During subsequent clock cycles, the micro instruction sequence associated with the string macro instruction is repeatedly generated by the translator 704.

During clock cycles 3–10 the translator has repeatedly generated the load/store micro instruction sequence to the instruction register. These instructions proceed down the pipeline for execution by the execution unit 708. As each load/store micro instruction sequence is completed, the counter 722 is decremented.

Execution of the repetitively generated load/store micro instruction sequence continues until the counter 722 reaches zero. At this point, a signal is generated by the counter 722 to both the translator 704, via the signal line 726, and to the execution unit 708, indicating that no more micro instructions associated with the string operation are to be either generated, or executed. The translator 704 receives the signal from the counter 722, and provides the NEXT instruction to the instruction register during the next cycle.

Up to this point, no overhead has been needed by the apparatus of the present invention in executing the macro string operation. This is true whether the string requiring manipulation was 8 or 1000 words in length. No test/branch overhead has been required. However, what remains in the pipeline are the load/store micro instructions which have already been provided by the translator 704, but not yet executed by the execution unit 708.

After receiving the counter equals zero signal 726 from the counter 722, the execution unit utilizes the string detection unit 724 to determine whether subsequent micro instructions are associated with a macro string instruction. One embodiment of the present invention sets a control bit in the opcode of string micro instructions to identify the instructions as appropriate for string operations. However, other methods may be used to identify particular micro instructions, or micro instruction sequences, as associated with string operations. If after receiving a counter equals zero signal 726 from the counter 722, the string detection unit 724 identifies a micro instruction as associated with a string operation, the execution unit 708 is notified. The execution unit 708 then performs a no operation instruction (NOP) rather than executing the micro instruction.

Thus, the present invention, upon receipt of a macro string instruction from the instruction memory 702, repeatedly generates a micro instruction sequence applicable to the macro instruction, until receiving a counter equals zero signal 726 from the counter 722. The execution unit 708, upon receiving the counter equals zero signal 726, detects whether remaining micro instructions in the pipeline are associated with a macro string instruction, and if so, performs NOP's in place of the micro instructions. Depending on the number of stages between the translator 704 and the execution unit 708, i.e., stages which contain string micro instructions generated by the translator 704, but not executed after the counter 722 reaches zero, the overhead associated with string operations can vary. In the present illustration, the overhead is equal to 2 clock cycles. Thus, the apparatus and method of the present invention has improved the processing speed of string instructions by reducing the overhead associated with execution of the instructions to a fixed constant, typically 2–3 cycles, regardless of the number of load/store operations that are required to implement the string operation. This is in contrast to the other methods discussed in the background above which require an overhead which is a relative percentage of the number of bytes or words to be operated upon.

A problem results, however, when interrupts or exceptions occur during the processing of string instructions, as described. For example, in the prior art method for handling string instructions, as discussed with reference to FIGS. 5 and 6, interrupts and exceptions are allowed only when each loop in the micro instruction is completed, i.e., on an instruction boundary. As one skilled in the art appreciates, the prior art methods disclosed in FIGS. 5 and 6 utilize a general purpose register, similar to that shown in FIG. 7 (720), to count the number of iterations remaining in a string operation. Thus, when an interrupt or exception occurs, the contents of this general purpose register may be examined upon return from the interrupt or exception, so that the string operation can know how many iterations are left, and can resume operation.

But, to eliminate the overhead associated with the prior art string operations, and to improve the execution speed of string operations, the translator generated string sequences discussed in FIG. 7 have not updated the general purpose register 720 at the end of each load/store operation. If an exception were to occur at the end of one of the load/store sequences, and the exception caused a branch in program flow away from the string operations, upon return the processor would not know how many load/store iterations remained to complete the string instruction.

Figure 9:
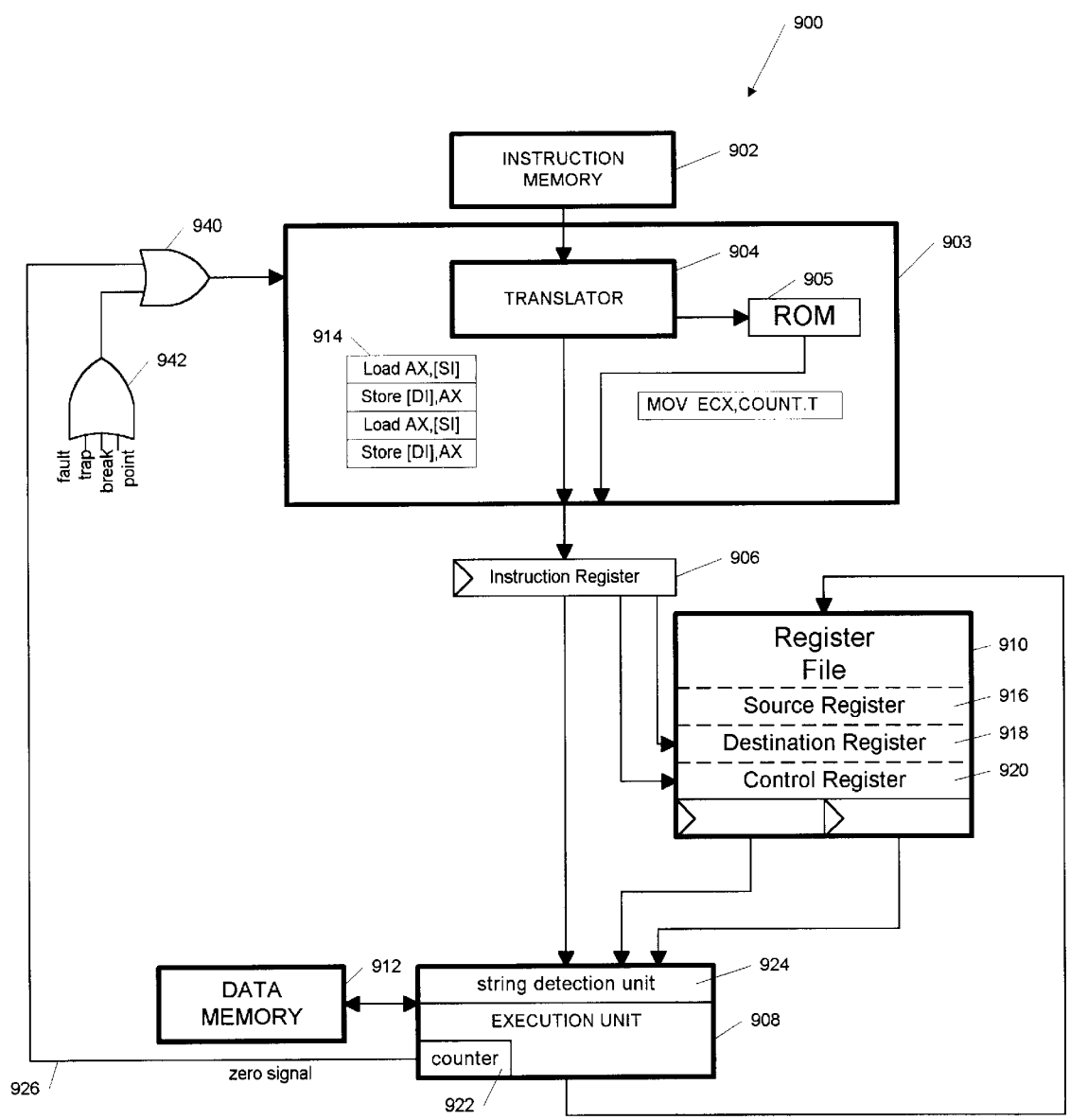
FIG. 9 is a block diagram of a processor according to the present invention for handling exceptions during translator generated string instructions.

Now referring to FIG. 9, an improved processor 900 is shown which includes an instruction memory 902 connected to a translator stage 903. The translator stage 903 includes a translator 904 and a control ROM 905. The translator stage 903 is also connected to an instruction register 906. The instruction register 906 is connected to an execution unit 908 and a register file 910. The execution unit 908 and the register file 910 are similar to those discussed with reference to FIG. 7, and have like numerical indicators, prefixed by nine in the hundreds digit. The execution unit 908 is shown connected to a data memory 912.

In operation, a macro string instruction is provided by the instruction memory 902 and presented to the translator stage 903. The translator stage 903 decodes the macro string instruction and begins providing a repetitive sequence of load/store operations from the translator 904 to the instruction register. The processor 900 continues generating and executing the load/store sequence until the counter 922 reaches zero, causing the zero signal 926 to alert the translator stage 903, to stop generating the load/store sequence, and causing the execution unit 908 to treat following load/store sequences as NOP's, as discussed with reference to FIG. 7. In addition, after the translator 904 ceases generation of the load/store sequence, the control ROM 905 provides a MOV ECX,COUNT.T micro instruction to the instruction register. The purpose of this micro instruction is to move the contents of the counter 922 into the general purpose register 920. If the counter 922 reached zero, then a value of zero would be moved into register 920. Inclusion of the MOV ECX,COUNT micro instruction at the end of the iterative load/store sequence, updates the general purpose register 920 with the proper value, and the .T suffix alerts the execution unit 908 that string operation is complete (i.e., has reached an instruction boundary).

Figure 1:
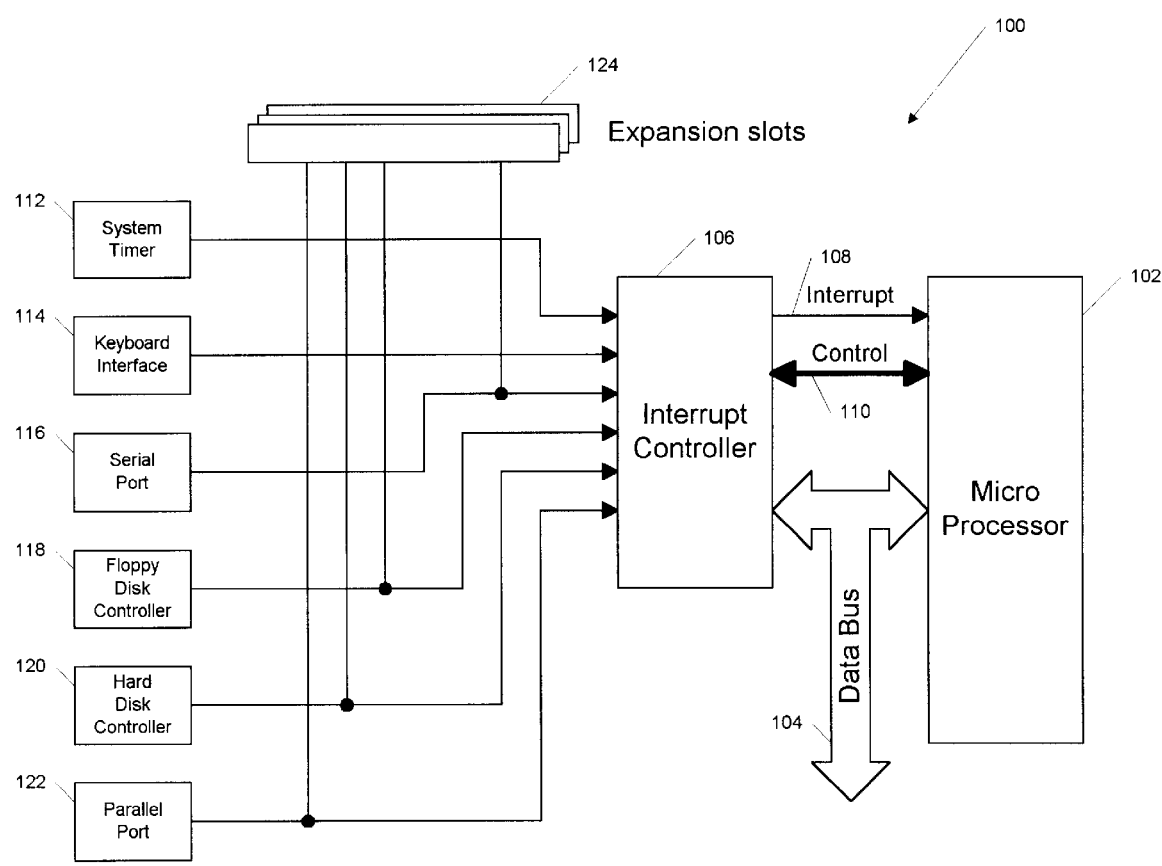
FIG. 1 is a schematic diagram of a computer system, illustrating a microprocessor having hardware interrupts.
Figure 2:
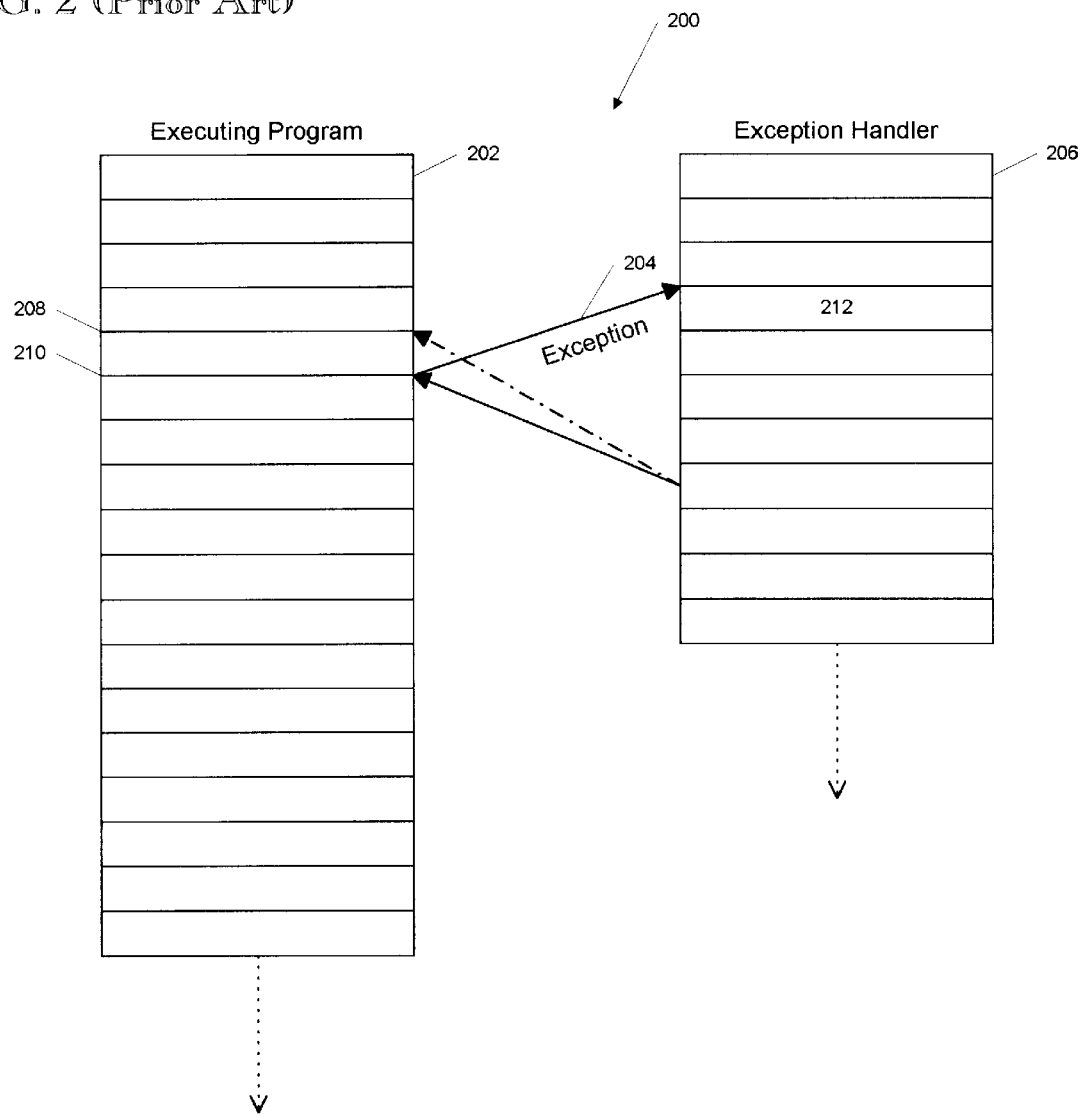
FIG. 2 is a memory map illustrating program flow when an exception occurs.
Figure 3:
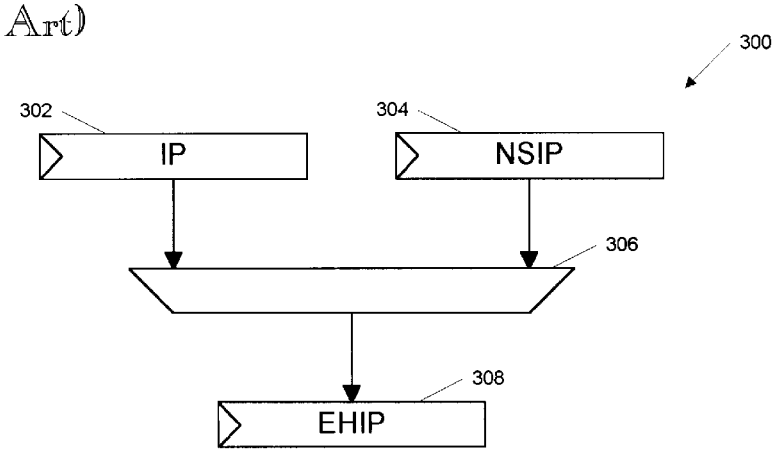
FIG. 3 is a block diagram illustrating the instruction pointers within a microprocessor.

To allow interrupts and exceptions to occur during translator generated string instructions, interrupts and exceptions are treated as if a counter equals zero condition has occurred in the execution unit 908. An OR gate 940 is provided which has the zero signal 926 as one of its inputs, and an output which is connected to the translator stage 903. The other input to the OR gate 940 is the output of an exception OR gate 942. The exception OR gate 942 has a number of inputs, each relating to types of exceptions which may occur in the processor 900. Thus, if an exception occurs, gate 942 provides a signal to gate 940, which in turn signals the translator stage 903 that a "zero signal" has been received. The translator 904 causes the control ROM 905 to generate the MOV ECX,COUNT.T instruction, which is later executed by the execution unit 908. After the value of the counter 922 has been stored in the general purpose register 920, and the execution unit 908 determines that an instruction boundary exists (from the .T suffix), then program flow is allowed to branch to the exception handler (not shown). As described with reference to FIGS. 2 and 3, the exception handler contains the programs required to correct specific exceptions, including faults, traps and aborts. The exception handler responds to the exception, and returns program flow back to the macro instruction which is pointed to by either the IP register 302 or the NSIP register 304, depending on whether the exception was a trap or a fault.

Figure 10:
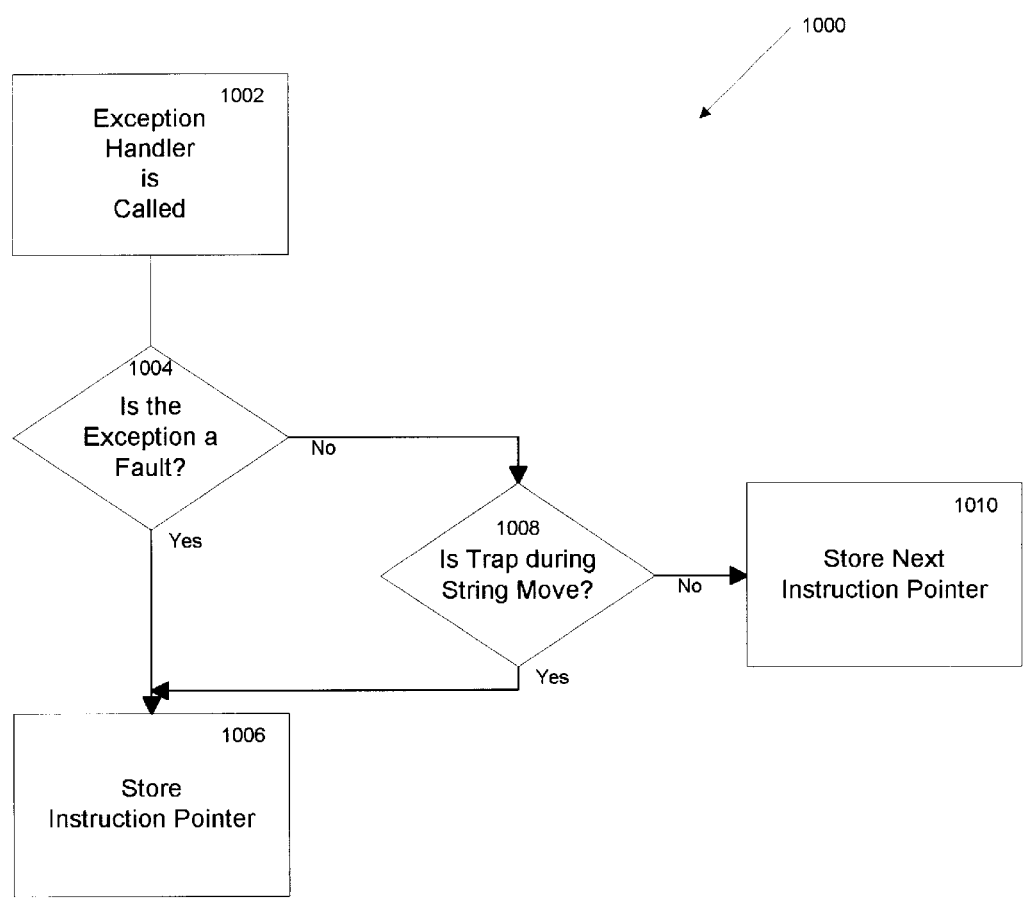
FIG. 10 is a flow chart illustrating exception handler microcode which is executed by the processor of FIG. 9.

However, in the case of an exception during a translator generated string instruction, what is desired is that program flow return to the macro string instruction that was excepted from, whether the error condition was a fault or a trap. And, if an exception occurs during a time when a string instruction is not being executed, then traps and faults should be handled in the manner discussed with reference to FIG. 3. So, within the exception handler, a program similar to that shown in FIG. 10 is provided which controls the instruction pointer storage when exceptions occur.

A program 1000 is shown which begins at block 1002. In block 1002, the exception handler is called. Within the exception handler, a test at decision block 1004 is made to determine whether the exception is a fault. If the exception was caused by a fault, then program flow proceeds to block 1006.

At block 1006, the current instruction pointer is stored in the register EHIP. This is true whether or not the fault occurred during a string operation.

If the exception was not caused by a fault, then instruction flow proceeds to decision block 1008. If decision block 1008 is reached, the exception must have been generated by a trap. Decision block 1008 determines whether the trap occurred during a string operation. If not, then program flow proceeds to block 1010 which stores the value of the NSIP register into the EHIP register, as discussed above.

If, however, the trap occurred during a string operation, then the current value of the IP register is stored in the EHIP register. One skilled in the art will appreciate that knowledge of whether the instruction pointed to by the IP register is a string instruction may be determined from several sources. Thus, after returning from a trap exception handler routine, rather than resuming program flow at the next instruction, the string instruction is restarted. The contents of the general purpose register 920 are provided to the counter 922, the translator 904 begins repetitively generating the load/store sequence, and the process continues until either the counter 922 reaches zero, or until another exception occurs.

Although the present invention has been described in considerable detail with reference to certain preferred versions thereof, other versions are possible. For example, the micro instruction sequence may be provided by a control ROM upon command by the translator. In addition, the counter may not reside within the execution unit, but may stand alone between the translator and the execution unit. Furthermore, it may be possible to update the contents of the general purpose register during each iteration of the translator generated sequence. If this is done, then initiation of the exception sequence would need only determine the type of trap which occurred, and whether a trap occurred during execution of a string operation.

Although the present invention and its advantages have been described in detail, it should be understood that various changes, substitutions and alterations can be made herein without departing from the spirit and scope of the invention as defined by the appended claims.

We claim:

1. A processing system for executing a string instruction, and for handling exceptions during the execution of the string instruction, the processing system comprising:
   a memory system, for storing a string of data;
   a translator, for decoding said string instruction into a repetitive sequence of micro instructions for operation upon said string of data, said repetitive sequence not containing a branch instruction for the purpose of repetition;
   an execution unit, coupled to said translator, for executing said repetitive sequence of micro instructions, wherein said execution unit detects whether micro instructions which it executes are associated with said string instruction;
   a counter coupled to said translator and to said execution unit, for storing a count value indicative of the number of times said repetitive sequence needs to be executed to operate on all of said string of data, for counting the number of times said execution unit has executed said repetitive sequence of micro instructions; and for providing a first signal to said translator when all of said string of data has been operated upon;
   a register, coupled to said counter, for temporarily storing count information during handling of said exceptions; and
   exception logic, coupled to said translator, for interrupting said execution of said repetitive sequence of micro instructions with a second signal upon the occurrence of an exception;
   whereby said second signal causes said processing system to transfer said count information to said register, to handle said exceptions, to transfer said count information to said counter, and to resume execution of said string instruction.

2. The processing system, as recited in claim 1, wherein said memory system comprises cache memory, dynamic-random-access memory, or permanent storage memory.

3. The processing system, as recited in claim 1, wherein said string of data comprises a plurality of bytes of data stored in sequential locations in said memory.

4. The processing system, as recited in claim 1, wherein said translator further comprises:
   a control ROM, for storing exception programs for handling said exceptions.

5. The processing system, as recited in claim 4 wherein said control ROM also stores non repetitive micro instructions associated with said string instruction.

6. The processing system, as recited in claim 5 wherein said control ROM provides said non repetitive sequence to said execution unit upon said translator receiving either of said first or said second signals.

7. The processing system, as recited in claim 1, wherein said repetitive sequence of micro instructions is provided continuously by said translator until either said first signal or said second signal is received.

8. The processing system, as recited in claim 7, wherein when said first signal is received by said translator, said count information having a value of zero is stored in said register.

9. The processing system, as recited in claim 7, wherein when said second signal is received by said translator, said count information having a value that is not zero is stored in said register.

10. The processing system, as recited in claim 9, wherein when said second signal is received by said translator, after handling said exception, said count information having a value that is not zero is transferred from said register to said counter.

11. The processing system, as recited in claim 10, wherein said translator begins generating said repetitive sequence of micro instructions upon returning from said exception.

12. The processing system, as recited in claim 1, wherein said counter comprises a temporary register which counts down towards zero during execution of said repetitive sequence.

13. A processing system having a translator for generating a repetitive sequence of first micro instructions related to a string instruction, a control ROM for providing second micro instructions to complete the string instruction and for storing exception routines, an execution unit for executing the first and second micro instructions and the exception routines, the processing system comprising:
   an instruction pointer, for pointing to a first macro instruction;
   a next instruction pointer, for pointing to a second macro instruction;
   control logic, connected to both of said instruction pointer and said next instruction pointer, for selecting between said first or said second macro instruction to be returned to after an exception; and
   exception logic for interrupting the execution unit with either a fault or a trap;
   wherein when said exception logic interrupts the execution unit with either a trap or a fault, if the processing system was executing the repetitive sequence of first micro instructions at the time of the interrupt, said control logic selects said first macro instruction to be returned to after said fault or trap; and
   wherein if the processing was not executing the repetitive sequence of first micro instructions at the time of the interrupt, and if the interrupt was a trap, said control logic selects said second macro instruction to be returned to after said fault or trap.

* * * * *